United States Patent [19]

Brown

[11] 3,938,876

[45] Feb. 17, 1976

[54] FRONT PROJECTION SCREEN MADE FROM A TRANSPARENT MATERIAL

[75] Inventor: John Brown, Flemington, N.J.

[73] Assignee: Qantix Corporation, Flemington, N.J.

[22] Filed: Dec. 19, 1974

[21] Appl. No.: 534,298

[52] U.S. Cl. .............................. 350/128; 350/129
[51] Int. Cl.² ...................................... G03B 21/60
[58] Field of Search .......... 350/128, 167, 106, 109, 350/127, 129

[56] References Cited
UNITED STATES PATENTS

| | | | |
|---|---|---|---|
| 2,351,034 | 6/1944 | Gabor | 350/128 X |
| 2,991,693 | 7/1961 | MacNeille | 350/128 |
| 3,782,805 | 1/1974 | Brown | 350/129 |

Primary Examiner—L. T. Hix
Assistant Examiner—E. M. O'Connor
Attorney, Agent, or Firm—Lerner, David, Littenberg & Samuel

[57] ABSTRACT

A front projection screen is disclosed which is made from a transparent material. Prism-like elements are formed on the backside thereof so that light incident upon the screen from a preferred direction will be totally reflected by the screen while light incident upon the screen from other directions will pass therethrough. Sides of the prism-like elements are curved for dispersion in the horizontal plane while the front surface of the projection screen has segments of cylindrical columns formed thereon perpendicular to the prism-like elements to provide an angular spread in the vertical plane. The thickness of the screen is between 30 percent and 70 percent of the focal length of the cylindrical columns to allow the screen to be tilted in the vertical plane.

2 Claims, 3 Drawing Figures

FRONT PROJECTION SCREEN MADE FROM A TRANSPARENT MATERIAL

FIELD OF THE INVENTION

This invention relates to projection screens and particularly front projection screens.

BACKGROUND OF THE INVENTION

Projection screens are well known in the art which are employed for picture display. Most screens as they are traditionally known have a material on the surface thereof for the purpose of dispersing light in a multitude of directions which is incident upon the screen from the projector.

In situations where the efficiency of the screen is important, attempts have been made to direct light incident upon the screen from the projector into a predetermined viewing area. For example in my prior patent, Ser. No. 178,990 which was filed on Sept. 9, 1971 and is entitled "Lenticular Projection Screen" now U.S. Pat. No. 3,712,708, a lenticular projection screen is disclosed which consists of a plurality of overlapping spherical concave lenses formed in reflective material. The lenses and the screen are constructed so that the projected light rays are reflected to predetermined viewing areas in front of the screen.

When screens are made of a reflective material it is of course obvious that reflections from sources other than the projector become a problem. In the past people have overcome this problem by using the screen in a dark room. Attempts have been made to use such screens in lighted areas by putting light absorbing elements in predetermined locations with respect to the reflective material in the screen. These attempts have been somewhat successful but have added additional annoyance to the use of the screen and/or additional cost and encumberance in the manufacture and use of the screen. Notwithstanding these efforts to overcome the problems of unwanted reflections, difficulties are still encountered when using these screens.

Even in a dark movie theater, people open the door to come in and go out and ushers use flashlights which create difficulty with reflections therefrom. The use of light absorbing material while having a limited beneficial affect still does not completely overcome the problem of unwanted reflections.

On Dec. 14, 1926, U.S. Pat. No. 1,610,423 issued to A. J. Cawley which was entitled "Daylight Projecting System." In FIG. 4 of this patent a daylight projection screen is disclosed in which a transparent material is shaped to have prism like ridges on the back thereof for the purpose of reflecting light which is incident thereon from a predetermined angle. Cawley teaches that the critical angle of the material should be as close to 45° as possible and that the angle of the sides of the prism like portions should be inclined with respect to the plane of the material at 45°. The reason for this is to insure that only light incident upon the screen from a single direction will be reflected back towards the audience. All other light incident upon the screen will strike one side of the prism or the other at an angle less than 45° with respect to a normal to the surface thereof and pass therethrough rather than be reflected.

The Cawley system is an interesting curiousity but is of no practical significance since all of the light is focused back in a single direction so that the audience must be located directly in front of the screen. If the screen is moved by an angle of say 1° with respect to the incoming projected light, the image reflected back to the audience will be lost because the largest portion of the light incident upon the screen from the projector will pass therethrough rather than being reflected back. Further, if the audience is not sitting at the precise angular relationship with respect to the screen, they will again see very little because the screen of Cawley will project light back parallel to the rays incident thereof and provide no dispersive angular affect of reflection.

In my prior U.S. Pat. No. 3,782,805, I disclosed a front projection screen made from a sheet of light transmitting material and having a predetermined critical angle of internal reflection less than 45°. That front projection screen, as the one disclosed herein, had a plurality of parallel ridges on the front and the back thereof with specific relationships (as does the screen of the instant invention) between the ridges on the backside thereof and the critical angle of internal reflection.

In that patent, I taught that the thickness of the screen determined the degree of vertical dispersion and further taught that with a zero thickness, maximum dispersion would be achieved and with a thickness equal to the focal length of the ridges on the front surface, no dispersion would be achieved. In that patent, I taught further that the optimum thickness for mechanical stability would be between one and one and half times the focal length of the front ridges.

I have found that a screen of such thickness will not produce double images as taught in my patent. I have further found that unwanted dead spots in the viewing area does result. I have further found that if the screen is constructed of a thickness for optimum dispersion in the vertical plane, the screen cannot be tilted in the vertical plane with respect to the projected light without losing some reflection in the viewing area. As a result of this, the vertical location of the projector with respect to the screen becomes critical and, further, often requires the location of the projector at a vertical location which interferes with the viewing area.

Therefore, it is an object of this invention to provide a new and improved front projection screen.

It is a further object of this invention to provide a front projection screen which efficiently uses the light provided by the projector, does not reflect undesirable images to the audience and is viewable from positions other than directly in front of the screen.

It is still another object of this invention to provide a front projection screen which may be employed in daylight with a minimum of reflection without the use of light absorbing members affixed thereto.

It is yet another object of this invention to provide a front projection screen which can be tilted in the vertical plane with respect to a projector without affecting reflection.

BRIEF DESCRIPTION OF THE INVENTION

With these and other objects in view the present invention contemplates a front projection screen made from a sheet of light transmitting material having a predetermined critical angle of internal reflection less than 45°; the sheet has a front surface and a back surface; the back surface having formed thereon a plurality of parallel ridges; each of the ridges have curved sides terminating at a peak; the curved sides extend away from the sheet at an angle equal to or greater than 45°; the angle of the sides with respect to the sheet continuously decrease as the curved sides extend towards the peak; the angle of the sides being greater than or equal to the predetermined critical angle of internal reflection at the peak but less than 45°. The front surface has formed thereon a plurality of parallel ridges each forming a section of a cylinder. The ridges on the front surface are disposed perpendicularly to the ridges on the back surface for the purpose of giving dispersion of the light in the vertical plane.

The thickness of the screen is made to be between 30 and 70 percent of the focal length of the cylindrical sections on the front thereof to provide a screen which can be tilted with respect to the projector in the vertical plane without affecting the reflection of the projector images.

DESCRIPTION OF THE DRAWINGS

For a more complete understanding of the invention, reference should be made to the following detailed description and drawings in which.

DETAILED DESCRIPTION OF THE INVENTION

Figure 1:
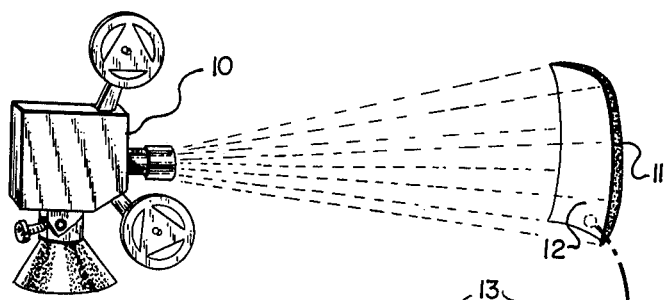
FIG. 1 is a schematic prospective view of a front projection system employing a screen constructed in accordance with the teachings of this invention.

Referring now to FIG. 1 we see a front projection system employing a screen constructed in accordance with the teachings of this invention. A projector 10 is mounted a fixed distance from a screen 11 which is formed as a section of a sphere having a radius of curvature equal to the distance between the screen 11 and the projector 10. It is of course understood that as the distance between the projector 10 and the screen 11 becomes greater, the need for the precise curvature of the screen 11 becomes less important so that as the distance becomes substantial the screen 11 may in fact be flat. The reason for the curvature of the screen 11 is to insure that the rays of light emanating from the projector 10 incident upon the screen 11 strikes a front surface of the screen 12 normal thereto at each point thereof.

Figure 2:
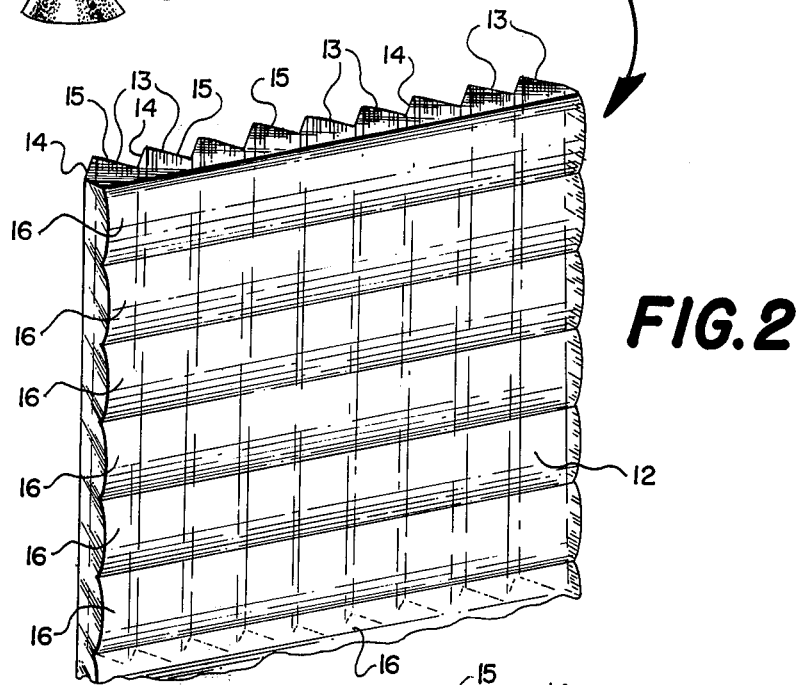
FIG. 2 is a front prospective view of a section of the screen shown in FIG. 1.

Referring now to FIG. 2 we see the details of a small section of the screen 11. It should be understood that the screen is uniform throughout so that the section shown in FIG. 2 is representative of the makeup of screen 11.

The screen 11 is made from a transparent material which has a critical angle of internal reflection less than 45°. A critical angle of internal reflection is defined as the angle at which light must strike a surface of a material when passing from the inside to the outside thereof to a second predetermined medium so as to be totally reflected rather than passing to the second medium. The angle of incidence as referred to above is measured between the ray of light and a line normal to the surface of interest at the point of incidence. The critical angle of internal reflection is the angle which defines the limit of total reflection so that any incident light beam which has an angle of incidence greater than the critical angle will be totally reflected.

Figure 3:
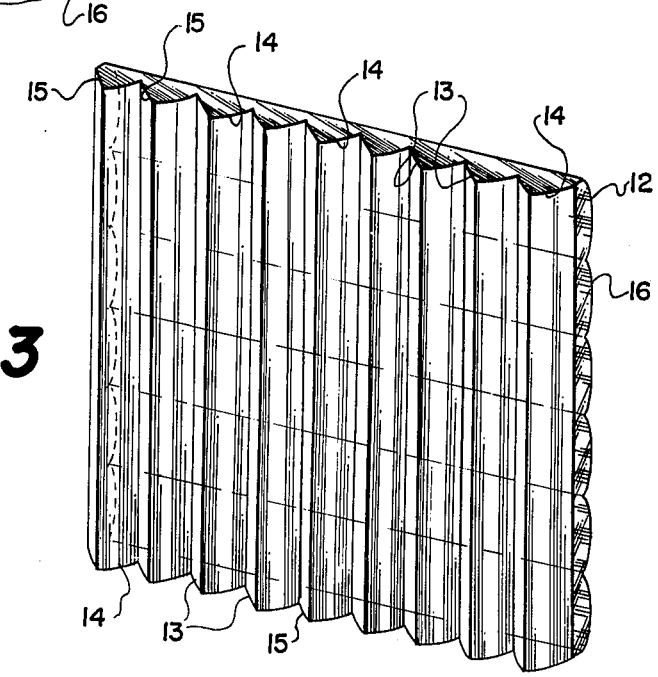
FIG. 3 is a back prospective view of the screen shown in FIG. 1.

As can be seen when looking at FIGS. 2 and 3 the back surface of the screen 11 has a plurality of ridges thereon which form prism like elements. The ridges 13 are parallel to each other and have curved sides 14 and 15. Each of the curved sides 14 and 15 meet at a peak thereof which appears in FIG. 3 as a line.

The angle of the sides 14 and 15 with respect to a plane extending through the screen 11 at the point of interest is equal to or greater than 45°. As the sides 14 and 15 extend away from the screen 11 towards the intersection thereof, the angle with respect to the aforementioned plane decreases until the intersection is reached. At the intersection or peak, the angle of the side 14 and/or 15 with respect to the aforementioned plane is less than 45° but greater than or equal to the critical angle of internal reflection of the material forming the screen 11. The curvature of the sides 14 and 15 as above described is the key to the functioning of the instant screen. In the first place, without regard to any other considerations, the curvature of the sides 14 and 15 allow a certain amount of leeway in the angular relationship between the projector 10 and the mounting of the screen 11. As will be appreciated if a predetermined angle were necessary with a tolerance of 1° or less, the slightest movement of the projector 10 or the screen 11 would render the system less functionable and therefore would detract from it as a commercial item. By curving the sides of the screen 14 and 15 by, for example 6° to 10°, a considerably greater range of angular tolerance in without greatly adding to the directions from which ambient light can be reflected back to the audience.

Further advantages accrue from the curvature of the sides 14 and 15 which render the screen 11 of the instant invention a commercially usable item. By curving the sides, the direction in which light incident upon the screen 11 is transmitted back towards the audience is determined by the portion of the side 14 or 15 upon which it strikes. Therefore if the sides 14 and 15 were straight, all of the light incident thereon would either be reflected directly back towards the projector or if at an improper angle of incidence would pass therethrough. Under the teaching of the instant invention, the light incident upon the screen 11 at a predetermined angle will be reflected back towards the audience at a plurality or range of angles which can be controlled by the degree of curvature of the sides 14 and 15 to provide a predetermined viewing area greater than merely directly in front of the screen. While this curvature does increase the directions from which light will be reflected back, the small angular range of viewing areas necessary for display purposes renders the compromise a practical commercial one.

A light ray emanating from the projector 10 and striking the screen 11 so as to hit the surface 14 or 15 close to a trough will be hitting a surface of approximately 45°. Such a light ray will be totally reflected and passed across to an opposite side thereof ad is reflected back toward the projector parallel to the incident light ray. It should be noted at this point that a reversal or inversion takes place in small segments of the picture as the light rays pass through the prism like ridges 13.

It will be appreciated that as the position of incidence of a light ray varies along a side 14 or 15 of a ridge 13, the angle at which the light ray will strike the back surface of the screen 11 will be altered since all incident light rays are parallel to each other. Therefore as the position moves from the 45° at the troughs of the ridges 13 towards the lessening angles at the peaks thereof, the direction in which light ray is reflected back towards the audience is varied. It will be appreciated that since there are two reflections and each time a reflection occurs, the angle of deviation from 45° is multiplied by two in terms of direction of reflection, a 6° curvature in the sides 14 and 15 of the ridges 13 will result in a dispersion of 24° on each side of the normal to the screen. It will of course be appreciated that additional dispersion occurs due to refraction as the light ray passes back out the front face of the screen 11 so that the small curvature at the back thereof provides a substantial degree of dispersion of the projected light. In contradistinction to this if in fact the sides were straight, not only would the dispersion caused by the curvature of the sides 14 and 15 not occur, but no refraction would occur since the light entering the front face of the screen 11 normal thereto would exit normal thereto and be undisturbed.

At this point it is important to understand that the curvature must begin at an angle of 45° or greater since no light would be reflected back towards the audience if there were not a 45° angle. Therefore, the 45° angle provides the beginning point of total reflection. An angle of greater than 45° will not reflect at all in the present configuration since one of the sides 14 or 15 would allow the light ray to pass completely therethrough or would reflect the ray elsewhere. It is thought that it is better to allow a small amount of light to be lost rather than have a dead spot in the center of the audience. In the preferred embodiment, the critical angle of the material making up the screen 11 is less than 45° by an amount equal to the degree of curvature desired in the sides 14 and 15. Thus if a 6° curvature were desired, a material having a critical angle of 39° would be employed so that the sides 14 and 15 would vary in angle of curvature from slightly greater than 45° to cover the center portion of the audience to 39° at the peak. As a result of such an arrangement, all of the projected light incident upon the screen would be reflected back towards the desired portions of an audience array while the maximum angle of directions from which ambient incident light would be reflected is minimized.

Several materials exist which have critical angles in internal reflection with respet to air with approximately 39°. For example, polystyrene has a critical angle under such circumstances of 38.93° while poly (N-2, phenethyl) methacrylamide has a critical angle of 39.01 and poly (o-tolyl) methacrylate has a critical angle of 39.54. Listed below are additional materials which are suitable for use as the material making up the screen 11 with their critical angle with respect to air at 20° to 25° centigrade listed adjacent thereto:

| MATERIAL | CRITICAL ANGLE |
|---|---|
| polymethylacrylate | 42.53 |
| polyethylacrylate | 42.92 |
| polytutylacrylate | 43.01 |
| polyethoxyethylacrylate | 42.83 |
| poly (2 methoxyethyl) acrylate | 43.12 |
| poly (2 bromo sec.butyl) acrylate | 40.43 |
| poly (2 bromo phenyl) acrylate | 38.34 |
| poly (2 chloromethyl) acrylate | 41.23 |
| polyacrylonitrile | 41.47 |
| polymethylmethacrylate | 42.16 |
| polyethylmethacrylate | 42.33 |
| poly butyl methacrylate | 42.4 |
| poly (i-butyl) methacrylate | 43.09 |
| polycyclohexyl methacrylate | 41.59 |
| poly (2-hydroxyethyl) methacrylate | 41.41 |
| poly (2-phenoxyethyl) methacrylate | 39.96 |
| poly phenylmethacrylate | 34.82 |
| poly (o-chloro) styrene | 38.4 |
| poly (2.6) dichloro) styrene | 37.99 |
| poly (0-methoxy) styrene | 38.87 |
| polyacetal | 41.47 |
| poly (n-benzyl) methacrylamide | 38.78 |
| poly (N-butyl) methacrylamide | 41.36 |
| polyvinyl chloride | 40.53 |
| polyvinyl fluoride | 38.68 |
| polyvinylidene chloride | 38.68 |
| polyvinyl acetate | 42.97 |
| polyvinyl carbazole | 36.36 |
| polyvinyl isobutyl ether | 43.58 |
| polyvinyl alcohol | 41.81 |
| poly (n-vinyl) phthalimide | 38.13 |
| polyallyl phthalate | 41.21 |
| polyester-Styrene | 40.5 |
| poly carbonates (bisphenol) | 39.12 |
| zinc crown glass | 41.24 |
| higher dispersion crown glass | 41.14 |
| light flint glass | 39.41 |
| heavy flint glass | 37.31 |
| heaviest flint glass | 31.94 |

Looking at the front surface of the screen 12, it will be noted that a plurality of ridges 16 are formed thereon which are disposed perpendicularly to the ridges 13 formed on the back surface of the screen. It will be noted that the ridges 16 are formed from arcuate portions of cylinders. In this particular instance, each ridge 16 forms the surface of 30° of a cylinder. These ridges 16 act as optical elements for operating on the incoming light from the projector 10 for the purposes of creating dispersion of the light to a predetemined range of areas in front of the screen 11 in the vertical field.

It should be appreciated that the ridges 16 operate in conjunction with the reflecting surfaces 14 and 15 to provide the dispersion in the vertical plane. Therefore, the position of the surfaces 14 and 15 with respect to the ridges 16 (the thickness of the screen 11) determines the degree of dispersion produced by the ridges 16. Therefore if the back surface of the screen 11 made up of the surfaces 14 and 15 were considered flat and positioned at the focal point of each of the ridges 15, there would be no vertical dispersion of light. Rather, all of the light would be focused to come out parallel to the incident light. By varying the thickness it will be appreciated that a vertical field will be developed as the thickness of the screen is made less than the focal length of the ridges 16. The angle of dispersion and therefore the vertical field of the screen is increased until the thickness approaches zero.

It has been found that when the vertical field is maximized, the screen cannot be tilted in the vertical plane with respect to the projector without losing some of the reflected picture. As a result, a screen with maximum vertical field requires the vertical positioning of the projector at a precise location.

Normally, the location required for the projector is at a height which interferes with the viewing area. In situations where the precise vertical location of the projector with respect to the screen is not predetermined, it is desirable to have a screen which can accept projected light at various angles with respect to the screen in the vertical plane. It has been found that when the thickness of the screen is one half the focal length of the ridges 16, the maximum flexibility is achieved with regard to vertical tilting of the screen with respect to the projected light. It has been found that when the thickness of the screen is between 30 percent and 70 percent of the focal length of the ridges 16, practical screens having a good trade-off between vertical field and tilt ability are achieved. Since the decrease of focal length increases dispersion, it is of course preferred to employ screens having thicknesses between 30% and 50% of the focal length of the ridges 16.

It should be understood that while this invention has been described with respect to a specific embodiment thereof numerous others may become obvious to those of ordinary skill in the art in light thereof.

What is claimed is:

1. A front projection screen made from a sheet of light transmitting material having a predetermined critical angle of internal reflection less than 45%; said sheet having a front surface and a back surface; said screen being characterized by:

said back surface having formed thereon a plurality of parallel ridges; each of said ridges having curved sides terminating at a peak; said curved sides extending away from said sheet at an angle equal to or greater than 45° immediately adjacent to said sheet; the angle between a line tangent to said sides and said sheet continuously decreasing as said curved sides extend towards said peak; the angle between a line tangent to said sides and said sheet being greater than or equal to said predetermined critical angle of internal reflection at said peaks but less than 45°;

said front surface having formed thereon a plurality of parallel ridges each forming a section of a cylinder; said ridges on said front surface being disposed perpendicularly to said ridges on said back surface; and said parallel ridges which form sections of cylinders each have therefore a focal length and the distance from said front surface to said back surface is between 30 percent and 70 percent of said focal length.

2. The front projection screen as defined in claim 1 in which the distance from the front surface to said back surface is between 30 percent and 50 percent of said focal length.

* * * * *

UNITED STATES PATENT OFFICE
CERTIFICATE OF CORRECTION

Patent No. 3,938,876    Dated  February 17, 1976

Inventor(s)  John Brown

It is certified that error appears in the above-identified patent and that said Letters Patent are hereby corrected as shown below:

Column 4, line 27 after "tolerance" add -- is built --;

line 55, the word "ad" should read -- and --.

Signed and Sealed this fourth Day of May 1976

[SEAL]

Attest:

RUTH C. MASON
Attesting Officer

C. MARSHALL DANN
Commissioner of Patents and Trademarks